United States Patent
Huard et al.

(10) Patent No.: US 10,414,216 B2
(45) Date of Patent: Sep. 17, 2019

(54) METHOD FOR ADAPTING THE STRATEGY FOR ACQUIRING MEASUREMENTS OF RADIAL ACCELERATION OF THE WHEELS OF A VEHICLE

(71) Applicants: Continental Automotive France, Toulouse (FR); Continental Automotive GmbH, Hannover (DE)

(72) Inventors: Jean-Charles Huard, Toulouse (FR); Nicolas Guinart, Toulouse (FR)

(73) Assignees: Continental Automotive France, Toulouse (FR); Continental Automtive GmbH, Hannover (DE)

( * ) Notice: Subject to any disclaimer, the term of this patent is extended or adjusted under 35 U.S.C. 154(b) by 0 days.

(21) Appl. No.: 16/062,347

(22) PCT Filed: Dec. 12, 2016

(86) PCT No.: PCT/EP2016/002092
§ 371 (c)(1),
(2) Date: Jun. 14, 2018

(87) PCT Pub. No.: WO2017/102072
PCT Pub. Date: Jun. 22, 2017

(65) Prior Publication Data
US 2018/0361802 A1    Dec. 20, 2018

(30) Foreign Application Priority Data
Dec. 18, 2015 (FR) ..................... 15 62762

(51) Int. Cl.
*B60C 23/04* (2006.01)
(52) U.S. Cl.
CPC ...... *B60C 23/0408* (2013.01); *B60C 23/0488* (2013.01)

(58) Field of Classification Search
None
See application file for complete search history.

(56) References Cited

U.S. PATENT DOCUMENTS

| | | | | |
|---|---|---|---|---|
| 7,760,080 B2 * | 7/2010 | Breed | ................ | B60C 23/0433 340/444 |
| 8,212,663 B2 * | 7/2012 | Fink | .................... | B60C 23/0433 340/442 |

(Continued)

FOREIGN PATENT DOCUMENTS

| | | |
|---|---|---|
| DE | 102006054317 A1 | 5/2008 |
| EP | 1216854 A2 | 6/2002 |

(Continued)

OTHER PUBLICATIONS

International Search Report and Written Opinion for International Application No. PCT/EP2016/002092, dated Feb. 20, 2017, 7 pages.

(Continued)

*Primary Examiner* — Peter J Macchiarolo
*Assistant Examiner* — Jermaine L Jenkins
(74) *Attorney, Agent, or Firm* — RatnerPrestia

(57) ABSTRACT

A method for adapting the strategy for acquiring measurements of the radial acceleration of the wheel sensors of a tire pressure monitoring system of a motor vehicle during phases in which the vehicle is stationary, in which the wheel sensors periodically measure parameters pertaining to the tires of the corresponding wheels, namely at least pressure, temperature and acceleration parameters. The method includes switching the radial acceleration measurement acquisition strategy of a wheel sensor during the "non-running" phases of the vehicle, between at least two state-of-activity modes, switching from a so-called "sleep" acquisition mode to a so-called "awake" acquisition mode when a pressure event is detected by the tire pressure monitoring system of the (Continued)

motor vehicle, the radial acceleration then being measured according to a period of significantly longer duration in "sleep" mode than in "awake" mode.

19 Claims, 2 Drawing Sheets

(56) References Cited

U.S. PATENT DOCUMENTS

| | | | |
|---|---|---|---|
| 8,843,267 B2 * | 9/2014 | Park | B60C 23/0416 |
| | | | 701/34.4 |
| 9,776,461 B2 * | 10/2017 | Okada | B60C 23/0462 |
| 9,925,837 B2 * | 3/2018 | Peine | B60C 23/0494 |
| 10,086,661 B2 * | 10/2018 | Tsujita | B60C 11/243 |
| 2004/0037566 A1 | 2/2004 | Willebrand et al. | |
| 2008/0319701 A1 | 12/2008 | Brandi et al. | |
| 2011/0130919 A1 | 6/2011 | Neuscheler et al. | |
| 2014/0195107 A1 | 7/2014 | Park et al. | |

FOREIGN PATENT DOCUMENTS

| | | | | |
|---|---|---|---|---|
| EP | 1281949 A2 | 2/2003 | | |
| JP | 2005212669 A * | 8/2005 | | B60C 23/0476 |
| WO | 2004037566 A1 | 5/2004 | | |

OTHER PUBLICATIONS

English translation of the Written Opinion for International Application No. PCT/EP2016/002092, dated Feb. 20, 2017, 5 pages.

* cited by examiner

METHOD FOR ADAPTING THE STRATEGY FOR ACQUIRING MEASUREMENTS OF RADIAL ACCELERATION OF THE WHEELS OF A VEHICLE

CROSS REFERENCE TO RELATED APPLICATIONS

This application is the U.S. National Phase Application of PCT International Application No. PCT/EP2016/002092, filed Dec. 12, 2016, which claims priority to French Application No. 1562762, filed Dec. 18, 2015, the contents of such applications being incorporated by reference herein.

FIELD OF THE INVENTION

The present invention relates to a method for adapting the strategy for acquiring measurements of the radial acceleration from the wheel sensors of a tire pressure monitoring system (TPMS) of a motor vehicle.

BACKGROUND OF THE INVENTION

For safety purposes, an increasing number of motor vehicles possess detection systems including electronic boxes mounted on each of the wheels of the vehicle, enclosing sensors dedicated to measuring parameters such as the radial acceleration of the wheel, and the pressure and the temperature of the tire fitted to this wheel.

These monitoring systems are conventionally equipped with, on the one hand, electronic boxes 1 (also called 'wheel units') mounted on each of the wheels of the vehicle and incorporating, in addition to the aforementioned sensors, a microprocessor 10, a memory and a radiofrequency transmitter, and, on the other hand, with a central unit (not depicted, mounted on the vehicle) for receiving the signals transmitted by the radiofrequency transmitters of each wheel, including an electronic control unit (or ECU) incorporating a radiofrequency receiver connected to an antenna.

These wheel units periodically provide the central unit with measurements of basic parameters pertaining to each tire-pressure, temperature, acceleration. These measurements can then be exploited in target applications, notably:

automatic learning by the sensors or the monitoring of the position of the sensors themselves;

location of the wheels in order to monitor the tire pressure corresponding to each wheel located, detection of tire overload and tire wear.

The measurements, performed by dedicated sensors, are converted and transmitted to a microprocessor incorporated into the central unit via transmitter/receiver devices equipped with antennas and with a CAN bus. The collection of means implemented (sensors, central unit, communications network via the transmitters/receivers) forms a tire pressure monitoring system known conventionally by the English-language system abbreviation TPMS.

The numerical data supplied by the wheel units to the central unit indicate successive levels of variation. From these values, the central processing unit can, after filtering and sampling, formulate pressure, temperature, wear and/or overload signals for the purpose of transmitting these to the vehicle onboard computer.

One important aspect of the use of TPMS systems relates to reducing the energy consumption. Specifically, these systems, which use wireless communications means for long periods of time, are powered by energy sources of limited capacity, for example battery cells or inductive generators. Power consumption reducing circuits are known.

In general, in order to minimize the energy consumption of these TPMS systems, it is known practice to detect two chief modes of operation, namely a so-called "running" mode during which the vehicle is in motion, and a so-called "non-running" mode during which the vehicle is stationary, and to implement methods for automatically switching the wheel units of these TPMS systems to standby or "sleep" mode during the "non-running" modes of operation, the wheel units then not communicating with the electronic control unit.

These methods thus propose concentrating the pressure monitoring and the associated communications into the phases during which the vehicle is running. However, in order to detect these so-called "running" and "non-running" modes of operation, it is necessary to have a high level of responsiveness to detection of the onset of motion of the vehicle (for example, to respond in 16 seconds or less). This then entails periodically (at least every 16 seconds) measuring the radial acceleration of the vehicle to make it possible to detect that the latter has begun to move, and doing so throughout the duration of the mode of operation referred to as "non-running".

Thus, although such methods allow enough of an energy saving for the "running" modes, they do not, however, offer satisfactory efficiency because a large majority of the energy consumption of the wheel units of the TPMS systems takes place during the "non-running" phases, which represents 95% of the life of a motor vehicle.

In addition, TPMS development is chiefly targeted toward two objectives, namely:

reducing the size of the power sources (and, therefore, the capacity thereof), and implementing new functions, leading to additional power consumption.

The known devices and methods are unable to meet these requirements without significantly affecting the life of the wheel unit of the TPMS system. At the present time, the life of a wheel unit of a TPMS system is of the order of around ten years.

Another disadvantage with the known devices and methods is that they do not propose any sufficiently satisfactory solution regarding the responsiveness of the system to detecting that the vehicle has begun to move.

SUMMARY OF THE INVENTION

An aspect of the present invention aims to propose a method that is free of the aforementioned disadvantages, proposing to reduce the contribution of the "non-running" phases to the energy consumption so as to reserve the greatest possible amount of energy for the "running" phases, in comparison with the present systems, while at the same time maintaining a satisfactory TPMS wheel unit life and ensuring that the TPMS system exhibits a high level of responsiveness in the event of a pressure anomaly.

According to an aspect of the invention, a method is provided for adapting the strategy for acquiring measurements of the radial acceleration of the sensors of the wheel unit of a tire pressure monitoring system ("TPMS") of a motor vehicle during phases in which the vehicle is stationary, in which the sensors of the wheel unit periodically measure parameters pertaining to the tires of the corresponding wheels, namely at least pressure, temperature and acceleration parameters. This method is notable in that it consists in switching the radial acceleration measurement acquisition strategy of a wheel sensor during the "non-running" phases of the vehicle, between at least two state-of-activity modes, switching from a so-called "sleep" acquisition mode to a so-called "awake" acquisition mode when a pressure event is detected by the wheel unit of the TPMS system. The radial acceleration is then measured according to a period of significantly longer duration in "sleep" mode than in "awake" mode.

In other words, the method according to an aspect of the invention proposes modifying the recurrence of the radial acceleration measurements of the wheel unit of the TPMS system according to the tire pressure dynamics during "non-running" phases (or stationary phases) of the vehicle, so as to adapt the responsiveness to the detection of movement of the vehicle according to a pressure event.

The method according to an aspect of the invention affords several beneficial advantages. In particular:
- it makes it possible to improve the energy efficiency of the wheel units of the TPMS systems during "non-running" phases of the vehicle;
- it makes it possible quickly to detect that the vehicle has begun to move in order to alert the driver as promptly as possible if there is a pressure problem (such as a leak of tire inflation, gas or a low pressure in said tire) that has arisen during a phase in which the vehicle is stationary.

According to one advantageous exemplary embodiment, the recurrence of the radial acceleration measurements for detecting that the vehicle has begun to move is of the order of one minute during the "sleep" mode and is of the order of one to a few seconds during the "awake" mode.

According to one preferred and advantageous exemplary embodiment, the recurrence of the radial acceleration measurements for detecting that the vehicle has begun to move is of the order of 64 seconds during the "sleep" mode and is of the order of 4 seconds during the "awake" mode.

Thus, the method makes it possible to save the energy capacity of the battery of the wheel units of the TPMS system during the "non-running" phases of the vehicle, when no pressure event is detected, while at the same time guaranteeing the responsiveness of the availability of the information derived from the sensors of the wheel unit of the TPMS system if a pressure event is detected.

According to one advantageous exemplary embodiment, the recurrence of the pressure and temperature measurements during the "non-running" phases is identical to that of the radial acceleration measurements.

According to one advantageous exemplary embodiment, the pressure event detected is a variation in pressure.

According to one advantageous exemplary embodiment, the pressure event is taken into consideration if the measured pressure is below a predetermined threshold.

According to one advantageous exemplary embodiment, the pressure event is taken into consideration if the measured pressure is below 1.6 bar.

According to one preferred exemplary embodiment, the pressure event detected is a variation in a pressure/temperature ratio. This feature affords the beneficial advantage of being independent of variations caused by fluctuations in the temperature external to the tire.

According to one exemplary embodiment, a pressure event is taken into consideration if the pressure/temperature ratio is below a predetermined threshold.

According to one advantageous exemplary embodiment, the pressure event is taken into consideration if the pressure/temperature ratio is below (1.6 bar/20° C.).

According to one preferred and advantageous exemplary embodiment, a pressure event is taken into consideration if the absolute value of the ratio $[((P_1/T°_1)-(P_2/T°_2))/(P_1/T°_1)]$ is above a predetermined threshold.

According to one preferred and advantageous exemplary embodiment, a pressure event is taken into consideration if the absolute value of the ratio $[((P_1/T°_1)-(P_2/T°_2))/(P_1/T°_1)]$ is above 6%.

According to one advantageous exemplary embodiment, the switching from the "sleep" mode to the "awake" mode is triggered by an external command.

Thus it is possible to have a higher frequency at which radial acceleration measurements are required without a pressure event having to have occurred. Specifically, certain functions requiring radial acceleration values occur during the "non-running" phases of the vehicle, such as, for example, the location function of the TPMS systems with which the wheels of a vehicle are equipped. In addition, certain functions, which have no direct association with the pressure information, require good responsiveness in detection of the "running" phases of the vehicle.

BRIEF DESCRIPTION OF THE DRAWINGS

Other objects, features and advantages of aspects of the present invention will become apparent from the following description, provided by way of non-limiting example with reference to the appended drawings, in which.

DETAILED DESCRIPTION OF THE PREFERRED EMBODIMENTS

Figure 1:
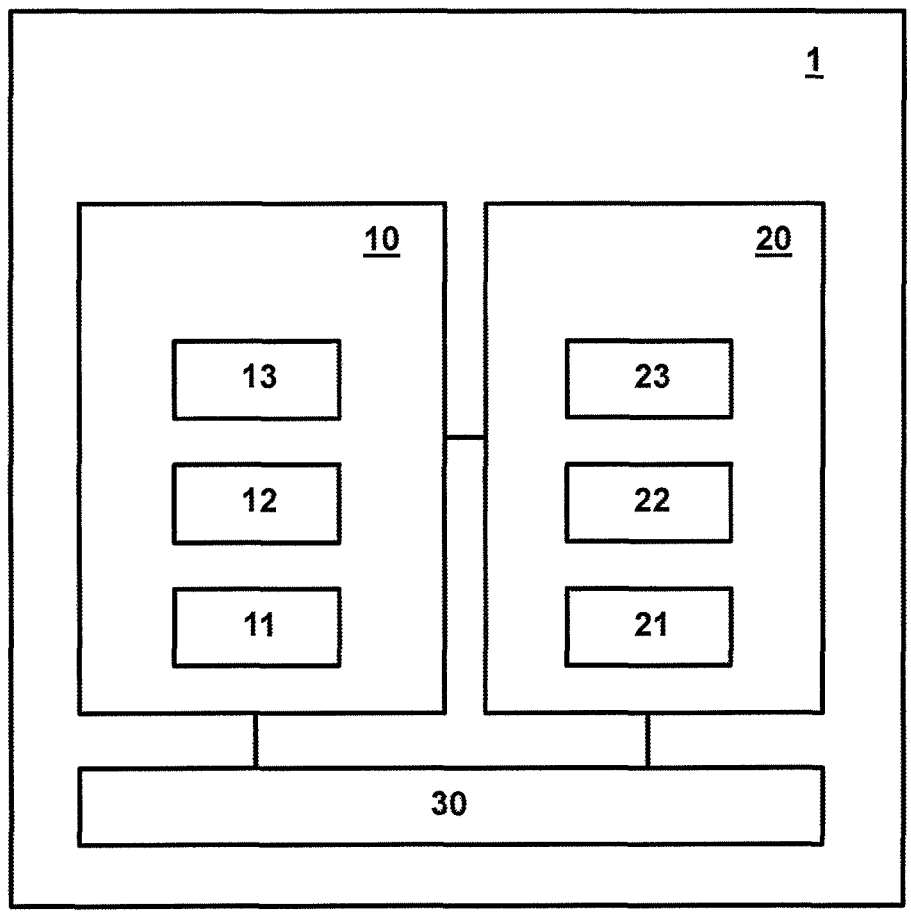
FIG. 1 depicts the block diagram of one example of a wheel unit comprising a wheel sensor control device able to implement the method according to an aspect of the invention.

The wheel unit 1 of the block diagram of FIG. 1 is installed in the wheel rim or on the internal face of the tread of each tire of a vehicle (not depicted). Such a wheel unit 1 is made up chiefly of a microcontroller 10 for managing the measurements supplied by a wheel sensor 20 comprising pressure 21, acceleration 22 and temperature 23 sensors.

The measurements are provided periodically according to a regimen dictated by counters 11 connected with a reference clock 12 and possibly stored in memories 13. The periods for the transmission of the measurements to the microcontroller 10 and between the microcontroller 10 and a central processing unit (not depicted) also referred to as an "ECU" which stands for "Electronic Control Unit", are adjusted according to the state-of-activity modes of the vehicle, in a way known per se.

The supply of electrical energy for switching on the sensors 21 to 23 and the microcontroller 10 is provided by a battery 30, the life of which needs to be optimized by reducing the consumption.

Figure 2:
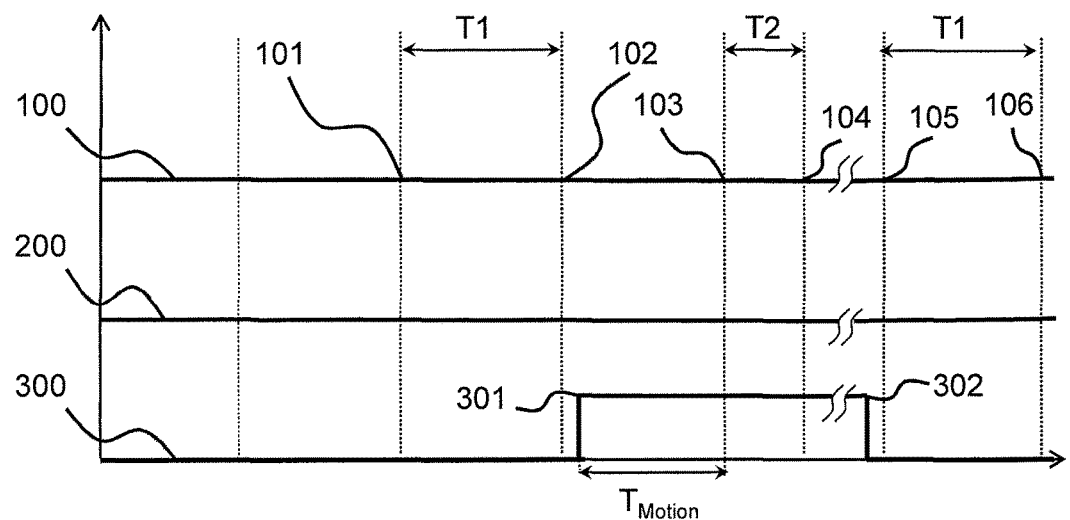
FIG. 2 illustrates a timing diagram comprising, for comparison, various logic signals, this timing diagram being depicted for the case where no pressure event occurs during the "non-running" phase of the vehicle.
Figure 3:
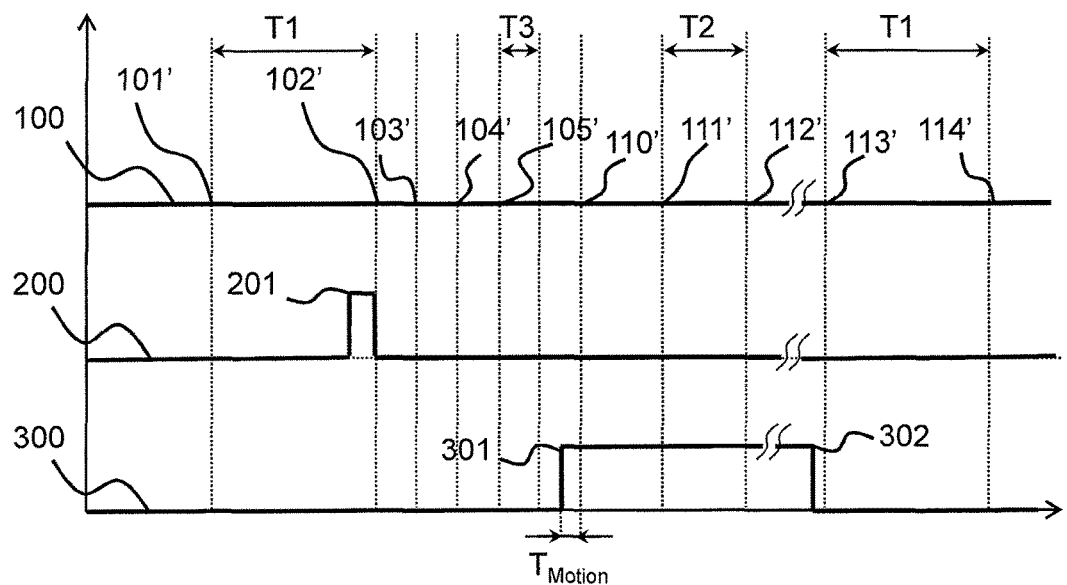
FIG. 3 illustrates a timing diagram comprising, for comparison, various logic signals, this timing diagram being depicted for the case where a pressure event occurs during the "non-running" phase of the vehicle.

In order to achieve this, an aspect of the invention then makes provision for the intervention of two specific state-of-activity modes of the acceleration sensors 22 of each wheel sensor 20, namely the "sleep" and "awake" mode, these "sleep" and "awake" modes constituting a general "non-running" mode in which the vehicle is stationary, as opposed to a "running" mode in which the vehicle is in motion. The remainder of the description is more particularly based on FIGS. 2 and 3 showing a timing diagram featuring three signals 100, 200 and 300 for the purposes of comparison.

The signal 100 represents an impulse signal for the acquisition of measurements of the radial acceleration applied to the acceleration sensor 22.

The signal 200 represents a signal for the detection of a pressure event. This pressure event is either a variation in pressure measured by the sensor 21, or a variation in a ratio of pressure and temperature which are measured jointly and respectively by the sensors 21 and 23. When no pressure event is detected, the signal 200 for detection of a pressure event is in the low state. When a pressure event is detected, the signal 200 for detection of a pressure event switches to the high state. Thus, in FIG. 2, no pressure event is detected and the signal 200 for detection of a pressure event is in the low state, and in FIG. 3, between the origin and the instant 201 of detection of a pressure event, the signal is in the low state and, at the instant 201 (the instant at which a pressure event occurs), the signal 200 switches to the high state. It should be noted that a pressure event may be a rapid event, such as a rapid leak caused by a puncturing of the tire, or a slow event, caused by a slow leak on the tire, etc. The signal 200 for detection of a pressure event returns to a low state as soon as the detection of the pressure event has occurred.

The signal 300 represents a signal that the vehicle has started to move. When the vehicle is stationary, the signal is in the low state, from the origin to the instant 301 that the vehicle begins to move, and then after the instant 301, when the vehicle is in motion (in other words when the speed of the vehicle is non-zero), the signal 300 for the movement of the vehicle is in the high state, until the instant 302 at which the vehicle stops. Next, from the instant 302 onward, when the vehicle is once again in the "non-running" phase, the signal 300 for the movement of the vehicle is in the low state.

With reference to FIG. 2, which illustrates a standard mode of operation of the acquisition method according to an aspect of the present invention, which means to say a mode with no particular pressure event, when the vehicle is in a so-called "non-running" phase (in other words is stationary), namely when the signal 300 for the movement of the vehicle is in the low state, the acceleration sensors 22 of each wheel unit are in a so-called "sleep" acquisition mode. During this "sleep" mode, the radial acceleration is measured at the instants 101, 102, 103 by the acceleration sensors 22 at a periodicity T1 referred to as "long", for example of the order of one minute. For example, the radial acceleration is measured every 64 seconds.

When the vehicle begins to move at the instant 301, the signal 300 for the movement of the vehicle switches from the low state to the high state so that at the instant 103 of the signal for the acquisition of the radial acceleration measurements, the information regarding the movement of the vehicle is received by the microprocessor of the wheel unit 1 and the latter sends a message to the radial-acceleration sensors 22 of the wheel units 1 with which the vehicle is fitted to switch the radial acceleration measurement acquisition strategy from the "non-running" mode to a "running" mode, the radial acceleration then being measured at the instants 104, 105, . . . , at a periodicity T2 referred to as "medium", for example the radial acceleration is measured every 16 seconds.

Thus, according to this "sleep" acquisition mode of the "non-running" mode, the recurrence of detection of the motion of the vehicle is slow which means that the start of vehicle movement is detected at the very latest after a time $T_{Motion}$ corresponding at maximum to the value of the "long" periodicity T1 (i.e. for example 64 seconds) after the vehicle has actually begun to move, and also the first data report from the wheel unit 1 that is received by the central processing unit is received at the very latest 64 seconds after the vehicle has begun to move, this presenting no problem insofar as no change to the pressure level of the vehicle tires has occurred while said vehicle has been stationary.

FIG. 3 illustrates an "awake" mode of operation of the acquisition method according to an aspect of the present invention, namely when a particular pressure event has occurred at one of the vehicle tires while this vehicle has been stationary.

When the vehicle is in a so-called "non-running" (stationary) phase, namely when the signal 300 for the movement of the vehicle is in the low state, the acceleration sensors 22 of each wheel unit are in a so-called "sleep" acquisition mode. As described previously, during this "sleep" mode, the radial acceleration is measured at the instants 101', 102' by the acceleration sensors 22 at a periodicity T1 referred to as "long", for example of the order of one minute. For example, the radial acceleration is measured every 64 seconds.

In this configuration, while the vehicle is stationary, a pressure event is detected at the instant 201 which means that the pressure event detection signal 200 switches from a low state to a high state. Such a pressure event is a significant variation in the pressure of one tire of the vehicle, as measured by the pressure sensor 21. For example, a pressure event is taken into consideration if the pressure of said tire is below a predetermined threshold, for example if the pressure is below 1.6 bar for a passenger vehicle.

According to one embodiment, the pressure event detected is a variation in a pressure/temperature ratio, which has the advantageous feature of being a value that is reliable regardless of the external environment.

Thus, a pressure event is taken into consideration if the variation in the pressure/temperature ratio of the tire is above a predetermined threshold.

For example, a pressure event is taken into consideration if the pressure/temperature ratio is below a predetermined threshold. According to one advantageous entirely nonlimiting example, a pressure event is taken into consideration if the pressure/temperature ratio is below (1.6 bar/20° C.).

According to one advantageous but entirely nonlimiting example, two pressure/temperature pairs (P; T°) are measured, these namely being a first pair $(P_1; T°_1)$ and a second pair $(P_2; T°_2)$, and a pressure event is taken into consideration if the absolute value of the ratio $[((P_1/T°_1)-(P_2/T°_2))/(P_1/T°_1)]$ is above a predetermined threshold. For example, for a passenger vehicle, a pressure event is taken into consideration if the absolute value of the ratio $[((P_1/T°_1)-(P_2/T°_2))/(P_1/T°_1)]$ is above 6%.

Thus, during the acquisition of the acceleration measurement at the instant 102', the state of the pressure event detection signal 200 has changed by comparison with the last acquisition (at the instant 101'). The strategy for the acquisition of the measurements of the radial acceleration by the wheel sensor then switches from the "sleep" mode to the "awake" mode. The radial acceleration is then measured according to a period of significantly shorter duration in "awake" mode than in "sleep" mode. The radial acceleration is measured at the instants 103', 104', 105' by the acceleration sensors 22 at a periodicity T3 referred to as "short", for example of the order of a few seconds. For example, the radial acceleration is measured every 16 seconds. For preference, the radial acceleration is measured every 4 seconds.

The pressure and temperature measurements are, for example, taken during the "non-running" phases of the vehicle, according to an acquisition strategy identical to that used for radial acceleration, namely measured at the instants 101', 102', respectively by the pressure 21 and temperature 23 sensors at a periodicity T1 referred to as "long", for example of the order of one minute. For example, the pressure and temperature are measured every 64 seconds, or alternatively measured at the instants 103', 104', . . . , according to a periodicity T3 referred to as "short", for example of the order of one minute. For example, the pressure and temperature are measured every 4 seconds.

Thus, according to this "awake" acquisition mode of the "non-running" mode, the recurrence of detection of the motion of the vehicle is rapid which means that the start of vehicle movement is detected at the very latest after a time $T_{Motion}$ corresponding at maximum to the value of the "short" periodicity T3 (i.e. here 4 seconds) after the vehicle has actually begun to move, and also the first data report from the wheel unit 1 that is received by the central processing unit is received at the very latest 4 seconds after the vehicle has begun to move, this allowing the driver to be alerted to a tire pressure problem as promptly as possible, for example by displaying a warning message on the instrument panel, via an icon and/or an audible signal, in a way known per se.

In order to allow the driver to be alerted to a tire pressure problem even more promptly, a periodicity T3 of the order of one second during the "awake" mode is envisioned. Thus, the driver is informed of a tire pressure problem instantly, as soon as the vehicle starts.

When the vehicle begins to move at the instant 301, the signal 300 for the movement of the vehicle switches from the low state to the high state so that at the instant 110' of the signal for acquisition of the radial acceleration measurements, the information regarding the movement of the vehicle is received by the microprocessor 10 of the wheel unit 1 and the latter sends a message to the radial-acceleration sensors 22 of the wheel units 1 with which the vehicle is fitted to switch the radial acceleration measurement acquisition strategy from the "non-running" mode to a "running" mode, the radial acceleration then being measured at the instants 111', 112', at a periodicity T2 referred to as "medium", for example the radial acceleration is measured every 16 seconds.

Thus, according to the method of an aspect of the invention, in order to economize on the energy consumption of the battery 30 in "non-running" mode, the radial acceleration measurements taken by the sensor 22 are performed with a "slow" periodicity (of the order of 1 minute), and this energy-saving makes it possible to increase the life of the wheel units 1 of the TPMS system by several months. This radial acceleration measurement acquisition periodicity is reduced when a pressure event, that needs to be communicated to the driver as promptly as possible, is detected.

When the vehicle stops at the instant 302, the signal 300 for the movement of the vehicle switches from the high state to the low state so that at the instant 113' of the signal for the acquisition of the radial acceleration measurements, the information regarding the stopping of the vehicle is received by the microprocessor 10 of the wheel unit 1 and the latter switches the radial acceleration measurement acquisition strategy from the "running" mode to a "non-running" mode, the radial acceleration then being measured again at the instants 114' and subsequent instants (not depicted) at a periodicity T1 referred to as "long", for example of the order of one minute. For example, the radial acceleration is measured every 64 seconds. For preference and advantageously, the transition from the vehicle "running" mode to the vehicle "non-running" mode takes place, in a way known per se, via an intermediate mode referred to as "interim". This "interim" mode generally corresponds to a use of the vehicle in an urban environment in which the vehicle has to stop and restart frequently. During this "interim" mode, the strategy for the acquisition of the radial acceleration measurements from the wheel sensor 20 is identical to that of the "running" mode, namely at the periodicity T2 referred to as "medium", for example the radial acceleration is measured every 16 seconds.

When, during this "interim" mode, the vehicle has stopped without restarting after a duration generally of the order of 15 minutes, the vehicle switches to "non-running" mode. The signal 300 regarding the movement of the vehicle then switches to the low state (for example at the instant 302), and the acceleration sensors 22 of each wheel unit 1, just like the pressure 21 and temperature 23 sensors, switch back to what is referred to as a "sleep" acquisition mode. As described previously, during this "sleep" mode, the radial acceleration, the pressure and the temperature are measured at the instants 114' and subsequent instants (not depicted) at a periodicity T1 referred to as "long", for example of the order of one minute. For example, the radial acceleration is measured every 64 seconds.

According to another advantageous exemplary embodiment of the method for adapting the strategy for acquiring measurements of radial acceleration of the wheel sensors of a TPMS system, the switch from the "sleep" mode to the "awake" mode is triggered by an external command. For example, the switching from the "sleep" mode to the "awake" mode is triggered manually by an operator. This feature makes it possible to have a higher frequency at which radial acceleration measurements are acquired during the "non-running" phases without a particular pressure event needing to have occurred. This then makes it possible to be able to implement certain functions that require values for the radial acceleration of the vehicle, such as, for example, the function known per se of locating the wheel units 1 of the TPMS systems with which the wheels of a vehicle are equipped, and to do so rapidly, thus reducing the TPMS system intervention times.

In the present description, the detection of vehicle motion is performed by means of radial-acceleration sensors with which the wheel units 1 are equipped. However, aspects of the present invention are valid and applicable to any device that makes it possible to evaluate the detection of vehicle motion such as, for example, a shock sensor.

The invention claimed is:

1. A method for adapting the strategy for acquiring measurements of a radial acceleration of wheel sensors of a tire pressure monitoring system of a motor vehicle during phases in which the vehicle is stationary, in which the wheel sensors periodically measure parameters pertaining to tires of corresponding wheels, namely at least pressure, temperature and acceleration parameters, the method comprising:

switching the radial acceleration measurement acquisition strategy of a wheel sensor during "non-running" phases of the vehicle, between at least two state-of-activity modes, switching from a so-called "sleep" acquisition mode to a so-called "awake" acquisition mode when a pressure event is detected by the tire pressure monitoring system of the motor vehicle, and measuring the radial acceleration according to a period of significantly longer duration in "sleep" mode than in "awake" mode.

2. The method as claimed in claim 1, wherein the recurrence of the pressure and temperature measurements during the "non-running" phases is identical to that of the radial acceleration measurements.

3. The method as claimed in claim 2, wherein the pressure event detected is a variation in a pressure/temperature ratio.

4. The method as claimed in claim 1, wherein the pressure event detected is a variation in pressure.

5. The method as claimed in claim 4, wherein the pressure event is taken into consideration if the measured pressure is below a predetermined threshold.

6. The method as claimed in claim 5, wherein the pressure event is taken into consideration if the measured pressure is below 1.6 bar.

7. The method as claimed in claim 1, wherein the switch from the "sleep" mode to the "awake" mode is triggered by an external command.

8. The method as claimed in claim 1, wherein the measuring of the radial acceleration is performed in both the "sleep" mode and in the "awake" mode.

9. A method for adapting the strategy for acquiring measurements of a radial acceleration of wheel sensors of a tire pressure monitoring system of a motor vehicle during phases in which the vehicle is stationary, in which the wheel sensors periodically measure parameters pertaining to tires of corresponding wheels, namely at least pressure, temperature and acceleration parameters, the method comprising:

switching the radial acceleration measurement acquisition strategy of a wheel sensor during "non-running" phases of the vehicle, between at least two state-of-activity modes, switching from a so-called "sleep" acquisition mode to a so-called "awake" acquisition mode when a pressure event is detected by the tire pressure monitoring system of the motor vehicle, and measuring the radial acceleration according to a period of significantly longer duration in "sleep" mode than in "awake" mode, wherein the recurrence of the radial acceleration measurements for detecting that the vehicle has begun to move is of the order of one minute during the "sleep" mode and is of the order of one to a few seconds during the "awake" mode.

10. The method as claimed in claim 9, wherein the recurrence of the radial acceleration measurements for detecting that the vehicle has begun to move is of the order of 64 seconds during the "sleep" mode and is of the order of 4 seconds during the "awake" mode.

11. The method as claimed in claim 10, wherein the recurrence of the pressure and temperature measurements during the "non-running" phases is identical to that of the radial acceleration measurements.

12. The method as claimed in claim 10, wherein the pressure event detected is a variation in a pressure/temperature ratio.

13. The method as claimed in claim 9, wherein the recurrence of the pressure and temperature measurements during the "non-running" phases is identical to that of the radial acceleration measurements.

14. The method as claimed in claim 9, wherein the pressure event detected is a variation in a pressure/temperature ratio.

15. A method for adapting the strategy for acquiring measurements of a radial acceleration of wheel sensors of a tire pressure monitoring system of a motor vehicle during phases in which the vehicle is stationary, in which the wheel sensors periodically measure parameters pertaining to tires of corresponding wheels, namely at least pressure, temperature and acceleration parameters, the method comprising:

switching the radial acceleration measurement acquisition strategy of a wheel sensor during "non-running" phases of the vehicle, between at least two state-of-activity modes, switching from a so-called "sleep" acquisition mode to a so-called "awake" acquisition mode when a pressure event is detected by the tire pressure monitoring system of the motor vehicle, wherein the pressure event detected is a variation in a pressure/temperature ratio, and measuring the radial acceleration according to a period of significantly longer duration in "sleep" mode than in "awake" mode.

16. The method as claimed in claim 15, wherein the pressure event is taken into consideration if the pressure/temperature ratio is below a predetermined threshold.

17. The method as claimed in claim 16, wherein the pressure event is taken into consideration if the pressure/temperature ratio is below (1.6 bar/20° C.).

18. The method as claimed in claim 15, wherein the pressure event is taken into consideration if an absolute value of the ratio $[((P_1/T°_1)-(P_2/T°_2))/(P_1/T°_1)]$ is above a predetermined threshold, $(P_1, T°_1)$ and $(P_2, T°_2)$ being two pressure/temperature pairs measured in a tire of the vehicle.

19. The method as claimed in claim 18, wherein the pressure event is taken into consideration if the absolute value of the ratio $[((P_1/T°_1)-(P_2/T°_2))/(P_1/T°_1)]$ is above 6%, $(P_1, T°_1)$ and $(P_2, T°_2)$ being two pressure/temperature pairs measured in a tire of the vehicle.

* * * * *